United States Patent [19]

Kondo

[11] Patent Number: 4,677,476

[45] Date of Patent: Jun. 30, 1987

[54] METHOD FOR DETECTING A MOVEMENT OF A TELEVISION SIGNAL

[75] Inventor: Tetsujiro Kondo, Kanagawa, Japan

[73] Assignee: Sony Corporation, Tokyo, Japan

[21] Appl. No.: 791,154

[22] Filed: Oct. 24, 1985

[30] Foreign Application Priority Data

Oct. 27, 1984 [JP] Japan .................................. 59-226604

[51] Int. Cl.$^4$ .......................... H04N 7/18; H04N 7/12
[52] U.S. Cl. ..................................... 358/105; 358/136
[58] Field of Search .................................. 358/105, 136

[56] References Cited

U.S. PATENT DOCUMENTS 3,936,800  3/1976  Ejiri et al. ............................. 358/105
4,307,420  12/1981 Ninomiya et al. .................... 358/105
4,346,405  8/1982  Yoda et al. ........................... 358/105

*Primary Examiner*—James J. Groody
*Assistant Examiner*—Michael D. Parker
*Attorney, Agent, or Firm*—Lewis H. Eslinger; Alvin Sinderbrand

[57] ABSTRACT

A method for detecting a movement of a television signal corresponding to the movement of a television camera during a panning operation includes dividing a picture plane of the television signal into blocks and obtaining an absolute value of a difference between pixel values from two consecutive frames for each block. The absolute value is integrated and a block matching table of frame difference integration data is derived therefrom. An extremum value of the frame difference integration data is linearly obtained from a maximum gradient of four gradients taken in upper, lower, left and right gradient directions from the respective origin of each block using the block matching table. This extremum value may be compared with frame difference integration data taken in four oblique directions intermediate the gradient directions to verify the extremum value.

2 Claims, 12 Drawing Figures

METHOD FOR DETECTING A MOVEMENT OF A TELEVISION SIGNAL

FIELD OF THE INVENTION AND RELATED ART STATEMENT

The present invention relates to a method for detecting a movement which is applied to detect a movement of a whole image by way of a panning or the like of a television camera in the case where, for example, an image pickup output of the television camera is compressed and transmitted.

A block matching method has been known as one of methods for detecting a movement vector of a television signal. In the block matching method, a picture plane is divided into a large number of small blocks and a comparison is made between the block to be processed in the previous frame and the portion near the block to be processed in the current frame, thereby detecting the block having the largest correlation.

As one of the methods for detecting the magnitude of the correlation, there is a method whereby an absolute value of a difference (frame difference) of the pixel data which correspond to each other between two blocks to be compared is obtained and the absolute values are integrated with regard to all pixels in the block and thereby obtaining the block having the minimum integration value. The block having the minimum integration value is detected as a position after the block to be processed moved. In this method, the movement of the television signal can be detected with an accuracy corresponding to the size of the block.

As another method for detecting the magnitude of the correlation, there is a method whereby the block in the current frame whose center coincides with the center of the block to be processed in the previous frame is moved on one-pixel unit basis and the position where the frame difference within this movement range, namely, within an inspection range becomes minimum is derived. According to this method, the movement of the television signal can be detected with an accuracy corresponding to the pixel.

In any of the foregoing conventional block matching methods, they adopt the full-number inspection such that all data in the regions which are considered as movement amounts are compared, so that there are drawbacks such that the number of comparison times required for detection is extremely large and it takes a long time to detect the movement of the television signal. On one hand, in discrimination of correlation, if a plurality of extremal values exist, the minimum value among these extremal values is simply selected. This causes a problem such that the image to be processed deteriorates in the case where the movement such as panning or the like of a television camera is detected and the movement is corrected on the basis of the result of the detection.

For example, in the case where mountains are used as a background image and a scenery in which an airplane (objective image) is flying in front of these mountains is picked up by a television camera, the television camera is panned to follow the airplane in such a manner that the objective image is located at the center of the finder. When the movement of the television signal is detected with respect to such a picture plane, the extremal value corresponding to the area of the objective image exists near the central point of the picture plane, while the extremal value corresponding to the size of the mountains (background image) exists as well at the location corresponding to the movement of the television camera. If the extremal value corresponding to the background image is selected in this case, the picture quality of the objective image deteriorates in association with the movement correction. Namely, since the movement correction is performed in such a manner that the movement of the television camera is detected and the coordinates are shifted by only the distance commensurated with the movement of the picture plane and then the image data in the previous frame is read out from the memory, if the coordinates are shifted in accordance with the movement of the background image, the movement of the objective image cannot be accurately reproduced.

OBJECT AND SUMMARY OF THE INVENTION

It is therefore an object of the present invention to provide a method for detecting a movement of a television signal in which in the case where this detecting method is applied to a detection of the movement of a television camera, a proper movement detection can be performed without causing the objective image to deteriorate.

It is another object of the invention to provide a method for detecting a movement in which the processing time is reduced and the hardware is simple as compared with a method whereby the integration of the absolute values of all frame differences is checked and an extremal value is detected within a movement inspection range.

The first invention relates to a method for detecting a movement of a television signal comprising:

a step of obtaining an absolute value of a frame difference in the case where all picture planes between continuous frames are shifted on one-pixel unit basis within a movement inspection range;

a step of integrating absolute values of the frame differences obtained at respective points within an inspection range with respect to one picture plane and detecting a frame difference absolute value integration table for a block matching; and a step 22 of sequentially obtaining the maximum gradient from among four upper, lower, left and right directions from an origin of the block as a start point using the block matching table and thereby linearly obtaining an extremal value.

The second invention further has a step 25 of verifying the extremal value in addition to the above-mentioned detection of the extremal value.

The table for a block matching is stored in a memory and the detection of the extremal value and verification of the extremal value are performed using the frame difference absolute value integration data in this table. The detection of the extremal value is started form the origin (movement vector is zero); therefore as in the case where the television camera pans, when the objective image is located at the center, the movement of this objective image can be detected. Since the extremal value is linearly searched form the origin, it is sufficient to use only a small part of a block as a region where the frame difference integration data are compared, so that the number of comparison times becomes small.

The above and other objects, features and advantages of the present invention will be more apparent from the following detailed description in conjunction with the accompanying drawings.

DETAILED DESCRIPTION OF PREFERRED EMBODIMENTS

One embodiment of the present invention will now be described hereinbelow with reference to the drawings. This embodiment fundamentally relates to the block matching method and to an example of which the present invention is applied to the movement detection of a television camera. Further, in this embodiment, to reduce the number of integration times, a difference between the pixel at the center (representative point) on the space of the block in the previous frame and each pixel of the block corresponding to the current frame is obtained, and the differences for every blocks obtained in this way are integrated with respect to one frame, thereby detecting the movement of one picture plane, namely, the movement of the television camera.

Figures 1, 2A, 2B, 2C:
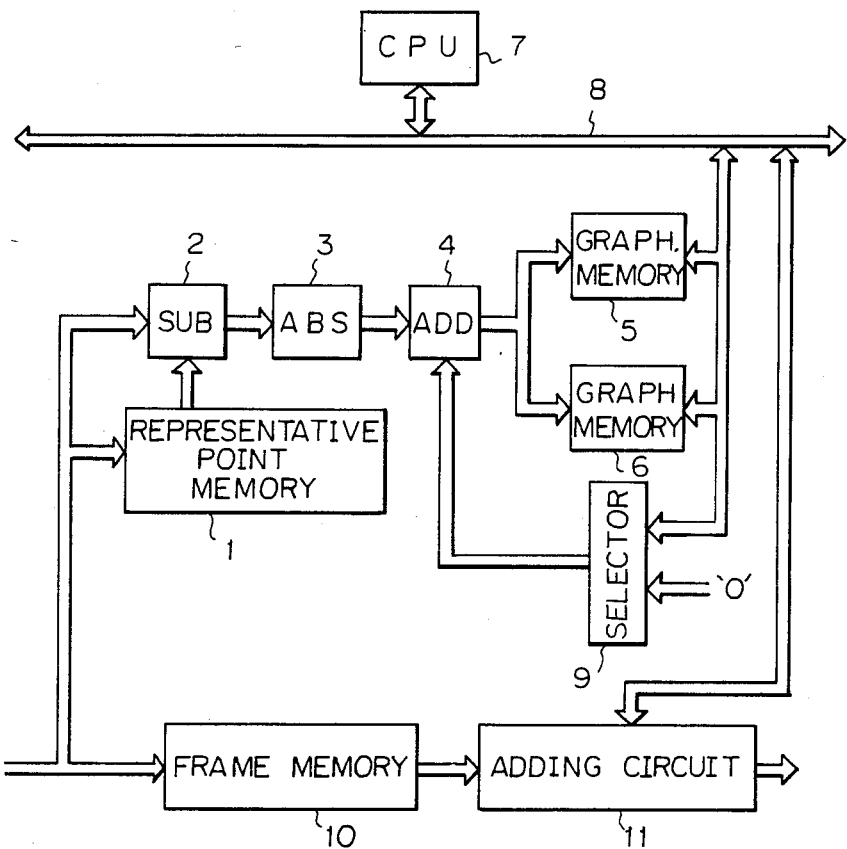
FIG. 1 is block diagram of one embodiment of the present invention.
FIGS. 2A-2C are time charts which are used to explain the operations of the graph memories in the embodiment of the invention.

In FIG. 1, a representative point memory 1 is provided to store the data of the representative point of each block in one frame in input image data. In a subtracting circuit 2, a difference between the representative point in the previous frame and the pixel in the corresponding block in the current frame is calculated. An output of the subtracting circuit 2 is converted to an absolute value by a converter 3 and is supplied to an adding circuit 4. An output of the adding circuit 4 is alternately written into a first graph memory 5 and a second graph memory 6 for every field.

The graph memories 5 and 6 are connected to a data bus 8 of a CPU 7. Outputs of the graph memories 5 and 6 are supplied to a selector 9. Data of all "0" is supplied as another input of the selector 9. Data of "0" is selected by the selector 9 and is supplied to the adding circuit 4 with respect to the pixel of the first block in one field. The graph memories 5 and 6 store the data of the pixel of one block. The absolute value of the differential data read out is supplied to the adding circuit 4 and the output of the adding circuit 4 is written into the original address, so that the integration value (frame difference integration table) of the differential data in one field is stored in the graph memories 5 and 6, respectively. The CPU 7 detects the extremal value and verifies this detected extremal value to see if it is correct or not by reference to the frame difference integration tables stored in the graph memories 5 and 6. In this case, the graph memories 5 and 6 are controlled so as to alternately perform the writing operation (whereby, the writing operation is performed after the reading operation was executed in order to integrate the frame difference as mentioned above) and the reading operation for every one field and also to carry out these operations at an opposite phase.

FIG. 2A shows a flag signal which is outputted from the graph memories 5 and 6 to the CPU 7 within a vertical blanking period. FIG. 2B shows the operation of the graph memory 5. The graph memory 5 performs the reading operation in the odd field and executes the writing operation in the even field. FIG. 2C shows the operation of the graph memory 6. The graph memory 6 performs the writing operation in the odd field and carries out the reading operation in the even field. The frame difference integration data respectively read out from the graph memories 5 and 6 are supplied to the CPU 7 and the extremal value is detected and verified.

It takes a time of one frame for the representative point memory 1, subtracting circuit 2 and converter 3 to integrate the absolute values of the frame differences detected for every blocks with regard to the whole frame. Therefore, the input image data is written into a frame memory 10 and the movement vector obtained is supplied from the CPU 7 to an adding circuit 11. This movement vector is added to the image data and is transmitted. On the reception side, the movement correction to shift the coordinate axes is performed using the movement vector.

Figure 3:
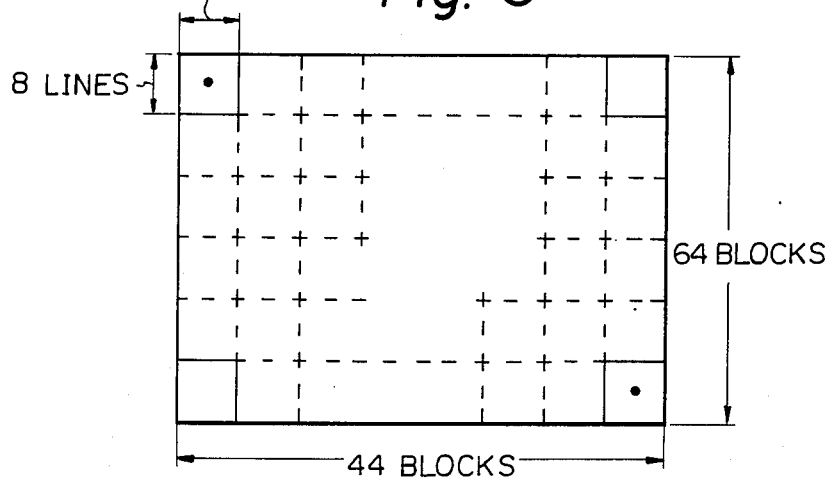
FIG. 3 is a schematic diagram which is used to explain the division of a picture plane in the embodiment of the invention.

FIG. 3 shows an example of division of a picture plane of one field. In this embodiment, a high quality television signal is processed and the size of one block (range of the moving amount) is such that is consists of eight lines in the vertical direction and thirty-two samples in the lateral direction. Therefore, 256 pixels are included in one block. One field is divided into sixty-four blocks in the vertical direction and into forty-four blocks in the lateral direciton.

Figure 4:
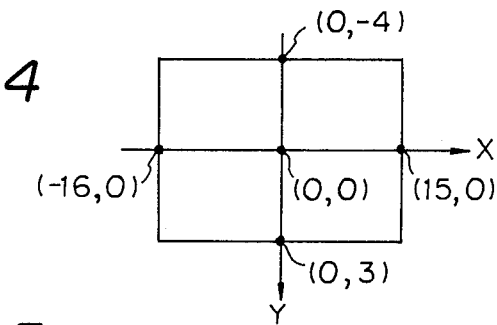
FIGS. 4 and 5 are shcematic diagrams which are used to explain a frame difference integration table in the embodiment of the invention.
Figure 5:
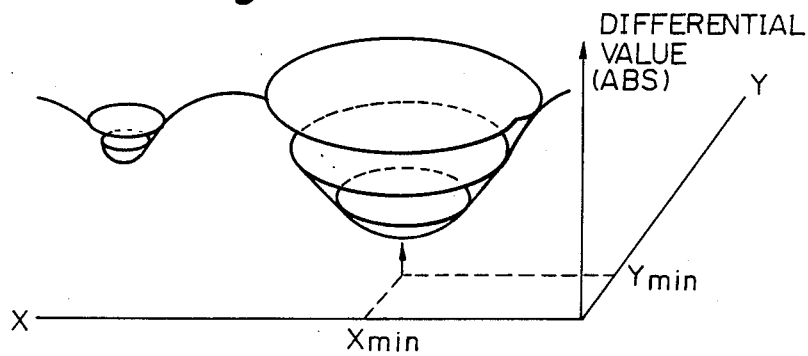

As shown in FIG. 4, the frame difference integration table which is respectively stored in the graph memories 5 and 6 is specified by the X-Y coordinates using the origin (0, 0) as a center. The X-Y coordinates include the values from −16 to 15 with regard to the X axis and the values from −4 to 3 with respect the Y axis. A frame difference integration table such as diagrammatically illustrated in FIG. 5 is formed in the graph memories 5 and 6, wherein an axis of ordinate indicates the absolute value of the differential value. The coordinate data ($X_{min}$, $Y_{min}$) of the proper extremal minimum value in this frame difference integration table is detected by the CPU 7. The vector connecting the origin and the coordinates ($X_{min}$, $Y_{min}$) detected is the movement vector.

The detection and verification of the movement vector which are performed by the CPU 7 using the data of the frame difference integration table stored in the graph memories 5 and 6 will then be described hereinbelow with reference to FIGS. 6 to 10.

Figure 6:
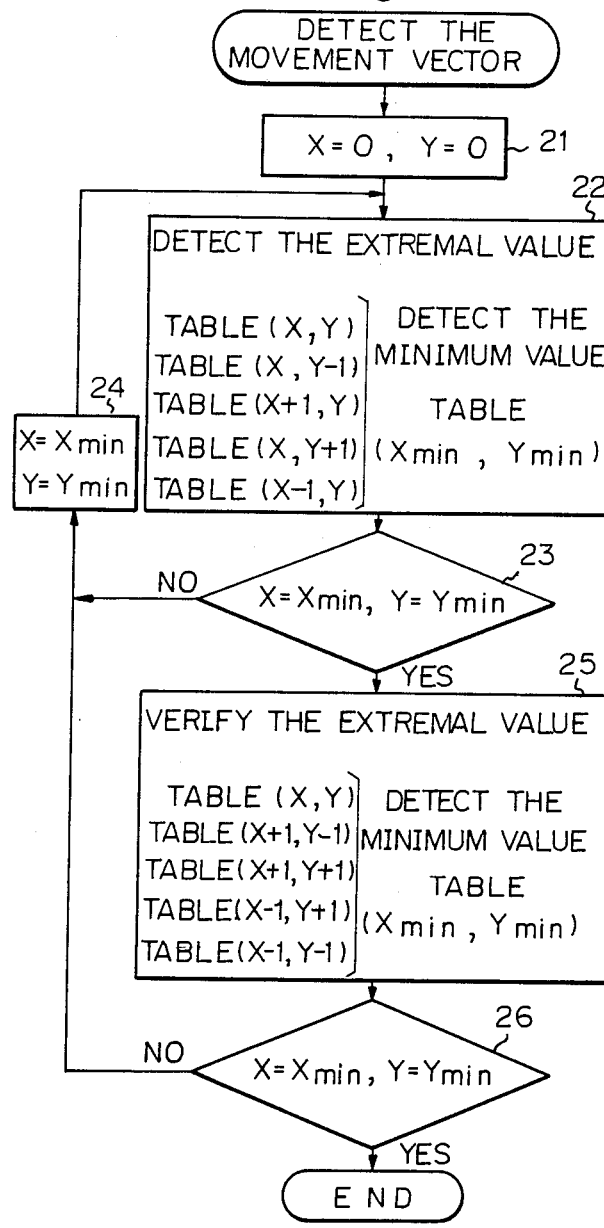
FIG. 6 is a flow chart which is used to explain the detection and verification of the extremal value in the embodiment of the invention.
Figure 7:
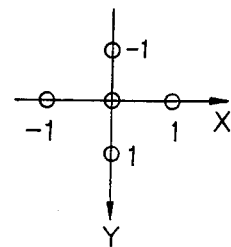
FIGS. 7 and 8 are shcematic diagrams which are used to explain the detection and verification of the extremal value.

As shown in FIG. 6, the movement detection is started from the origin (steps 21 and 22). FIG. 7 shows four frame difference integration data which are located adjacent to one another in four upper, lower, left, and right direction of the origin. In this case, the extremal value is detected by detecting the minimum value among the data (in FIG. 6, the indication of TABLE is added to express the data) of the respective coordinates of (0, 0), (0, −1), (1, 0), (0, 1), and (−1, 0) in the frame difference integration table. The coordinates ($X_{min}$, $Y_{min}$) of the minimum value are checked to see if they coincide with X and Y (in this case, (0, 0)) (step 23). If they coincide, step 25 for verification of the extremal value follows. Unless they coincide in step 23, the coordinates ($X_{min}$, $Y_{min}$) of the minimum value are replaced by X and Y (step 24), and the minimum value regarding the adjacent data which are located in four directions around the coordinates (X, Y) as a center is again detected (step 22).

In this way, the detection of the extremal minimum value is started from the origin and is performed in the maximum negative slant direction among four upper, lower, left, and right directions of the origin. The portion where all of the gradients of those four directions are not negative is found out as an extremal minimum value. If the coordinates of the minimum value coincide with the previous coordinates in step 23, the processing routine advances to step 25 for verification of the extremal value.

Figure 8:
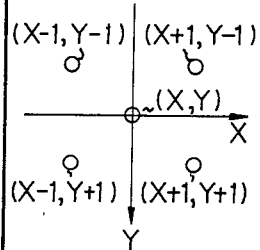

As shown in FIG. 8, in step 25, a detection is made to obtain the minimum value between each frame difference integration data of the coordinates of (X+1, Y−1), (X+1, Y+1), (X−1, Y+1), and (X−1, Y−1) which are located in the oblique direction of the coordinates (X, Y) of the extremal value detected and the frame difference integration data of the coordinates (X, Y) of the extremal value. When the coordinates ($X_{min}$, $Y_{min}$) of this minimum value detected coincide with the coordinates (X, Y), it is determined that the extremal value detected is correct. Unless they coincide, step 24 follows and the detection of the extremal value is again executed.

Figure 9:
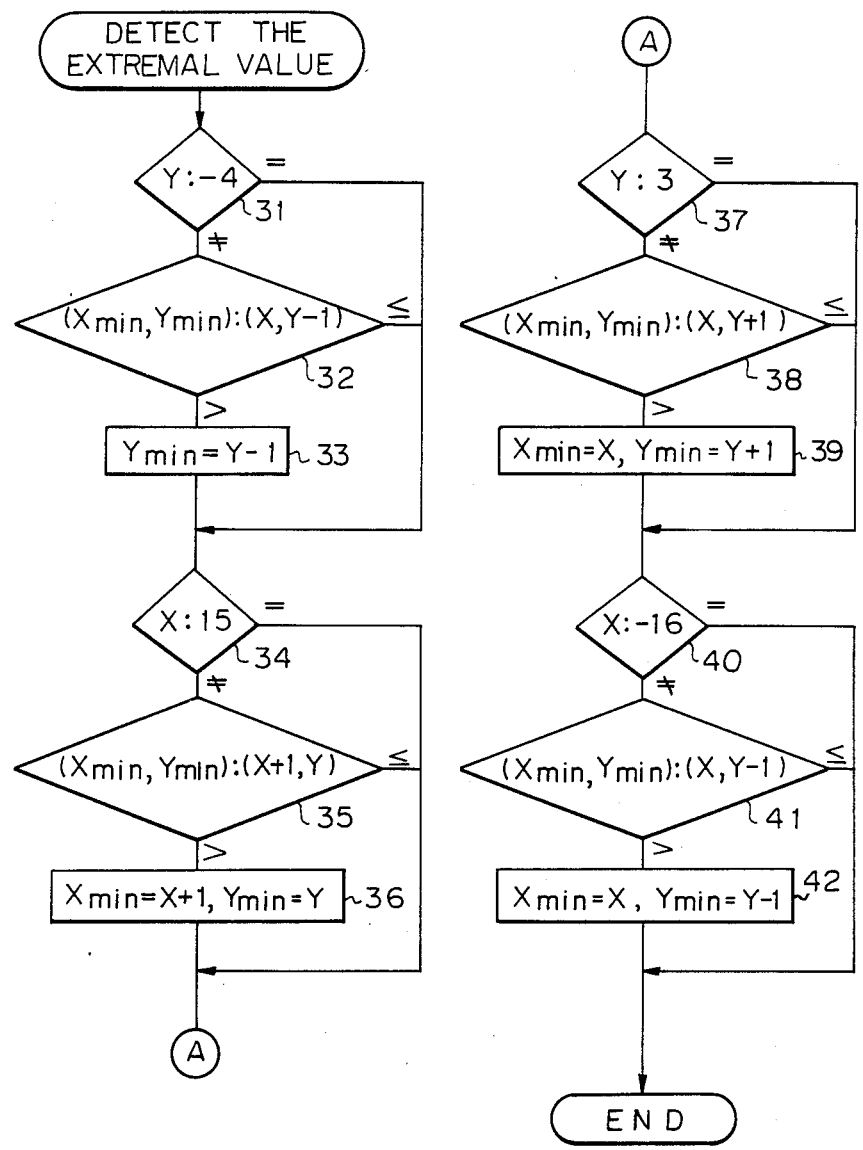
FIG. 9 is a flowchart showing a procedure for the extremal value detection in the embodiment of the invention.
Figure 10:
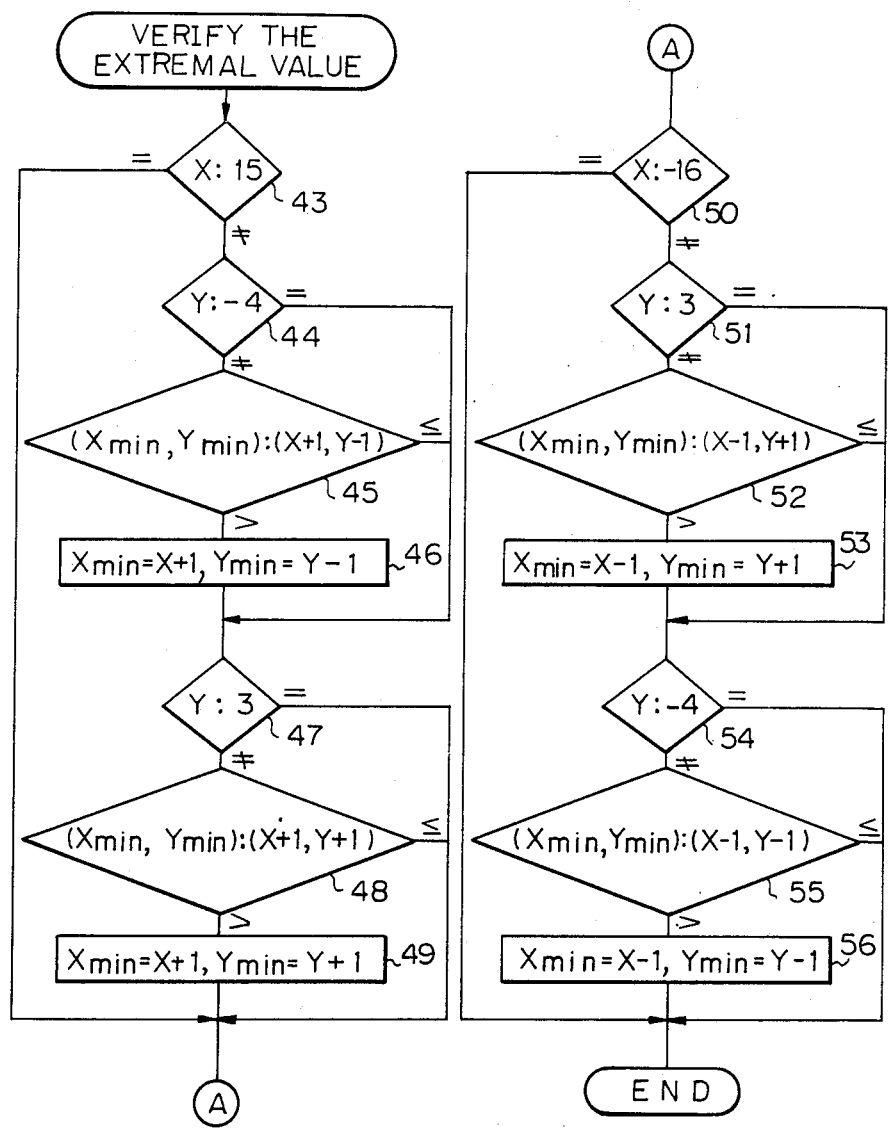
FIG. 10 is a flowchart showing a procedure for the extremal value verification in the embodiment of the invention.

FIG. 9 shows a more practical flowchart of step 22 for detection of the extremal value. FIG. 10 shows a more practical flowchart for verification of the extremal value. In FIGS. 9 and 10, ":" denotes a comparison of the sized of data. The indication of "TABLE" representative of the data of coordinates is omitted in FIGS. 9 and 10.

In this example, the detection of the extremal value is performed in such a manner that a comparison with the pixel in the upper direction is first made, a comparison with the pixel in the right direction is then made, a comparison with the lower direction is then made, and a comparison with the pixel in the left direction is finally made. In the first step 31 of the detection of the extremal value, a check is made to see if the coordinate Y coincides with −4 or not. When they coincide, this means that the data locating in the upper direction does not exist, so that the extremal value detection regarding the upper direction is skipped and the extremal value detection with respect to the right direction is performed. In step 32, a comparison is made between the data of the coordinates of ($X_{min}$, $Y_{min}$) detected as the minimum value and the data of the coordinates (X, Y−1) locating in the upper direction of that data.

When the data of the coordinates ($X_{min}$, $Y_{min}$) is larger than the data of the coordinates (X, Y−1), the Y coordinate of (Y−1) is given in place of $Y_{min}$ (step 33). If the data of the coordinates ($X_{min}$, $Y_{min}$) is equal to or smaller than the data of the coordinates (X, Y−1), the coordinate $Y_{min}$ is not changed.

After completion of the comparison with the frame difference integration data in the upper direction, a comparison with the frame difference integration data in the right direction is then be performed. In this case, first, a check is made to see if X equals 15 (X=15) or not (step 34). If X=15, the data which is compared does not exist in the right direction, so that step 35 for comparison with the data in the right direction is skipped.

In step 35, similarly to step 32, the sizes are compared between the frame difference integration data detected as the minimum value so far and the frame difference integration data in the right direction of that data. When the data in the right direction is smaller than the data of the coordinates ($X_{min}$, $Y_{min}$), the coordinate $X_{min}$ is replaced by X+1 and the coordinate $Y_{min}$ is replaced by Y+1 (step 36). If the data in the right direction is equal to or larger than the data of the coordinates ($X_{min}$, $Y_{min}$), the coordinates ($X_{min}$, $Y_{min}$) are not replaced.

Further, in steps 37 to 39, a comparison of the size with the frame difference integration data in the lower direction is made. Then, in final steps 40 to 42, a comparison of the size with the frame difference integration data in the left direction is made. In this way, the coordinates of the minimum value among four upper, lower, left, and right directions of the first coordinate position in the extremal value detection are obtained.

FIG. 10 is a flowchart showing a more practical procedure of step 25 for verification of the extremal value in FIG. 6. In the extremal value verification, a comparison of the size is first made between the data of the coordinates (X, Y) in the foregoing extremal value detection and the frame difference integration data of the coordinates (X+1, Y−1) in the right upper oblique direction of that data. In this case, a check is made to see if (X=15) or (Y=−4) or not (steps 43 and 44). When X equals 15 and Y equals −4, this means that no data exists in the right upper oblique direction, so that comparison step 45 and replacement step 46 are skipped.

Subsequently, a comparison of the size with the frame difference integration data in the right lower oblique direction is made. In this case, when Y equals 3, step 48 for comparison with the data in the right lower oblique direction and replacement step 49 are skipped.

Further, a comparison of the size with the frame difference integration data in the left lower oblique direction is made. In this case, a check is made to see if (X=−16) or (Y=3) or not (steps 50 and 51). When X equals −16 and Y equals 3, this means that the data for comparison does not exist in the left lower oblique direction, so that comparison step 52 and replacement step 53 are skipped.

Finally, a comparison of the size with the frame difference integration data in the left upper oblique direction is made. In this case, a check is made to see if (Y=−4) or not (step 54). When Y equals −4, that data for comparison does not exist in the left upper oblique direction, so that comparison step 55 and replacement step 56 are skipped.

As described above, a verification is made to see if the detected extremal value is the true extremal value or not, thereby preventing the erroneous extremal value from being detected.

According to the present invention, different from the detection of the extremal value by inspecting all data in the frame difference integration table, it is sufficient to perform the comparison in only a partial region of the straight line connecting the origin and extremal value. Therefore, the processing time is remarkably reduced and the detected extremal value can be verified. In addition, in this invention, a high speed operation is not required, so that the extremal value can be simply detected due to the control of the CPU and the circuit scale of the hardware can be decreased.

On one hand, when a plurality of extremal values exist in the frame difference integration table, the minimum value is not simply selected but a proper one of the extremal values can be selected. In other words, in this invention, the movement of a television signal can be detected in response to the movement of the objective image and deterioration of the objective image can be avoided. In addition, when the television camera is not moved, an influence of the moving object can be eliminated by detecting the extremal value near the origin.

Although the present invention has been shown and described with respect to preferred embodiments, various changes and modifications which are obvious to a person skilled in the art to which the invention pertains are deemed to lie within the spirit and scope of the invention.

I claim:

1. A method for detecting a movement of a television signal comprising the steps of:

dividing a picture plane of said television signal into a plurality of blocks having respective origins and obtaining an absolute value of a difference between pixel values from two consecutive frames for each of said blocks;

integrating said absolute value of the difference for each of said blocks with respect to said picture plane and deriving a block matching table of frame difference integration data therefrom; and linearly obtaining an extremum value of said frame difference integration data from a maximum gradient of four gradients taken in upper, lower, left, and right gradient directions from the respective origin of each of said blocks as a start point using said block matching table.

2. A method for detecting a movement of a television signal comprising the steps of:

dividing a picture plane of said television signal into a plurality of blocks having respective origins and obtaining an absolute value of a difference between pixel values from two consecutive frames for each of said blocks;

integrating said absolute value of the difference for each of said blocks with respect to said picture plane and deriving a block matching table of frame difference integration data therefrom;

linearly obtaining an extremum value of said frame difference integration data from a maximum gradient of four gradients taken in upper, lower, left, and right gradient directions from the respective origin of each of said blocks as a start point using said block matching table; and comparing said extremum value obtained with frame difference integration data in four oblique directions intermediate said gradient directions in said table and verifying said extremum value.

* * * * *